(12) United States Patent
Scheffler

(10) Patent No.: US 11,511,710 B2
(45) Date of Patent: Nov. 29, 2022

(54) BRAKING DEVICE FOR A VEHICLE

(71) Applicant: Marco Scheffler, Berlin (DE)

(72) Inventor: Marco Scheffler, Berlin (DE)

( * ) Notice: Subject to any disclaimer, the term of this patent is extended or adjusted under 35 U.S.C. 154(b) by 261 days.

(21) Appl. No.: 16/912,269

(22) Filed: Jun. 25, 2020

(65) Prior Publication Data

US 2020/0406871 A1 Dec. 31, 2020

(30) Foreign Application Priority Data

Jun. 28, 2019 (DE) .......................... 102019117569.0
Sep. 23, 2019 (DE) .......................... 102019125515.5

(51) Int. Cl.
| | |
|---|---|
| *B60T 7/22* | (2006.01) |
| *B60T 7/04* | (2006.01) |
| *B60Q 9/00* | (2006.01) |
| *B60T 8/171* | (2006.01) |
| *B60T 8/74* | (2006.01) |

(Continued)

(52) U.S. Cl.
CPC ............... *B60T 7/22* (2013.01); *B60Q 9/008* (2013.01); *B60T 7/042* (2013.01); *B60T 8/171* (2013.01); *B60T 8/74* (2013.01); *B60T 2201/022* (2013.01); *B60T 2210/32* (2013.01); *B60T 2270/82* (2013.01); *H04L 67/12* (2013.01); *H04W 4/80* (2018.02)

(58) Field of Classification Search
CPC .......... H04W 4/80; H04W 4/90; B60T 7/042; B60T 7/18; B60T 7/22; B60T 2201/022; B60T 8/171; B60T 8/74; B60T 2210/32; B60T 13/662; B60T 2270/82; B60W 50/14; B60W 30/0956; H04L 67/12; B60Q 9/008

USPC ........................................................ 701/70
See application file for complete search history.

(56) References Cited

U.S. PATENT DOCUMENTS 5,983,161 A 11/1999 Lemelson et al.
6,359,552 B1 3/2002 King
(Continued)

FOREIGN PATENT DOCUMENTS

CN 102282598 A 12/2011
CN 107054377 A 8/2017
(Continued)

OTHER PUBLICATIONS

German Office Action dated Apr. 23, 2020, in connection with German Patent Application No. 10 2019125515.5.

(Continued)

*Primary Examiner* — Atul Trivedi
(74) *Attorney, Agent, or Firm* — Norris McLaughlin, P.A.

(57) ABSTRACT

The present invention concerns a braking device for a vehicle. It is the purpose of the present invention to enable automatic braking upon detection of a braking action of a preceding vehicle which is concealed by an obstacle. The braking device for a vehicle according to the invention, comprises a brake pedal, a brake actuator, a control unit which is adapted to activate the brake actuator in dependence on the position of the brake pedal; wherein the brake actuator is activatable in dependence on a first signal, and wherein the first signal contains information about a first characteristic of a preceding vehicle covered by an obstacle, characterized in that the braking device is adapted to receive the first signal from a stationary transmitter.

10 Claims, 4 Drawing Sheets

(51) Int. Cl.
  *H04W 4/80* (2018.01)
  *H04L 67/12* (2022.01)

(56) References Cited

U.S. PATENT DOCUMENTS

| | | | |
|---|---|---|---|
| 6,411,206 B1 * | 6/2002 | Weant | F16D 66/00 340/479 |
| 7,486,199 B2 | 2/2009 | Tengler et al. | |
| 8,660,779 B2 | 2/2014 | Shida | |
| 10,081,343 B2 | 9/2018 | Dai | |
| 2002/0105423 A1 * | 8/2002 | Rast | G08G 1/162 340/467 |
| 2005/0133317 A1 * | 6/2005 | Chen | B60T 7/22 188/193 |
| 2009/0045932 A1 * | 2/2009 | Petersen | B60Q 1/448 340/467 |
| 2009/0212935 A1 * | 8/2009 | Luo | G08G 1/162 340/467 |
| 2010/0094509 A1 * | 4/2010 | Luke | B60W 40/02 342/52 |
| 2011/0270514 A1 | 11/2011 | Shida | |
| 2013/0211687 A1 * | 8/2013 | Trost | B60T 7/22 701/70 |
| 2015/0061895 A1 * | 3/2015 | Ricci | B60K 28/00 340/902 |
| 2019/0064803 A1 * | 2/2019 | Frazzoli | B60W 50/14 |
| 2019/0113916 A1 * | 4/2019 | Guo | B60W 50/02 |
| 2019/0279447 A1 * | 9/2019 | Ricci | B60Q 1/00 |
| 2022/0159440 A1 * | 5/2022 | Chen | H04B 17/318 |

FOREIGN PATENT DOCUMENTS

| | | | | |
|---|---|---|---|---|
| CN | 112141062 A | * | 12/2020 | B60Q 9/008 |
| DE | 10326358 B4 | * | 2/2013 | B60K 28/10 |
| DE | 102011052545 A1 | * | 2/2013 | B60T 8/1705 |
| EP | 1437275 A1 | * | 7/2004 | B60T 7/042 |
| EP | 1609689 A1 | * | 12/2005 | B60T 7/22 |
| EP | 2741944 A1 | * | 6/2014 | B60T 8/1705 |
| FR | 2926511 A1 | * | 7/2009 | B60Q 1/444 |
| GB | 2345321 A | * | 7/2000 | B60Q 1/52 |

OTHER PUBLICATIONS

Machine translation of Chinese Office Action dated Jun. 28, 2020, in connection with Chinese Application No. 2020105948928.

* cited by examiner

BRAKING DEVICE FOR A VEHICLE

The invention relates to a braking device for a vehicle. In particular, the present invention relates to a semi-automatic braking device for a motor vehicle.

PRIOR ART

Vehicle braking devices generally start a braking process of a vehicle. A current system for automatic or semi-automatic control of braking devices is, for example, a proximity cruise control. These systems control the braking device in such a way that one vehicle keeps its distance to the next vehicle as constant as possible.

The problem here is that if several vehicles are driving closely behind each other and a preceding vehicle starts a braking operation, the cruise control system or the driver himself can only react when the distance to the vehicle directly in front changes. At increased speed, heavy braking or close proximity, the driver or even the proximity control system cannot react in time and a rear-end collision occurs.

U.S. Pat. No. 6,359,552 B1 proposes to solve this problem by sending a signal from a transmitter to a receiver of the next vehicle when braking from a preceding vehicle, with the next vehicle continuing to send the signal to the next but one vehicle. In this case a warning is displayed for all vehicles receiving the signal. However, the problem here is that each vehicle in the chain must have a functioning transmitter and receiver system and if there is only one failure, the chain is broken.

U.S. Pat. No. 7,486,199 B2 proposes to solve this problem by providing for communication via fixed transmitter masts in addition to vehicle-to-vehicle communication. However, automatic braking is not revealed, as drivers are merely warned of a potential impact.

DISCLOSURE OF THE INVENTION

It is therefore an object of the present invention to enable automatic braking to take place upon detection of a braking action of a preceding vehicle which is concealed by an obstacle.

According to an aspect of the present invention, these objects are solved by the features of the independent claims. Appropriate features of the invention are contained in the dependent claims.

A first embodiment of a braking device of the invention for a vehicle, comprises
a) a brake pedal;
b) a brake actuator;
c) a control unit designed to activate the brake actuator as a function of the position of the brake pedal
d) wherein the brake actuator can be activated in dependence on a first signal, and
e) the first signal containing information on a characteristic of a preceding vehicle (at least partially obscured by an obstacle),
f) wherein the braking device is adapted to receive the first signal from a fixed transmitter.

The idea of the present invention is to transmit information about (not directly visible) further preceding vehicles to vehicles via fixed transmitters and to start an automatic braking process on the basis of this information.

According to an embodiment the obstacle is an additional vehicle located between the vehicle and the vehicle further ahead.

According to an embodiment the fixed transmitter is a Dedicated Short Range Communication (DSRC) transmitter mast.

According to an embodiment the braking device is designed to receive a second signal.

According to an embodiment the second signal contains information about a second characteristic of a preceding vehicle which is at least partially (possibly completely) obscured by an obstacle.

According to an embodiment the braking device comprises a means for displaying a warning, the means for displaying a warning being activatable as a function of the second signal. This has the advantage that automatic braking does not have to be applied immediately, but a warning is displayed only or additionally, if necessary.

According to an embodiment the means of indicating a warning is a display screen or a light bulb.

According to an embodiment the first characteristic of the preceding vehicle is a braking deceleration above a first predetermined limit and the second characteristic of the preceding vehicle is a braking deceleration above a second predetermined limit, the first predetermined limit being greater in magnitude than the second predetermined limit.

This has the advantage that light braking operations are not necessarily sent as a signal to subsequent vehicles (triggering an automatic braking operation).

The brake pedal may be the control device of a brake system. The brake pedal may be designed as a foot brake lever or as a hand lever.

The brake actuator may be activated by an electrical signal and starts the braking process by a mechanical movement, preferably independently of the position of the brake pedal. According to an embodiment, during braking, a brake pad is pressed onto a brake disc and the kinetic energy of the vehicle is converted into heat energy by friction.

The control unit may activate the brake actuator depending on the position of the brake pedal. According to an embodiment the contact pressure of a brake pad on a brake disc depends on the position of the brake pedal, even more preferably the contact pressure (linearly) increases with the position of the brake pedal.

The brake actuator may also be activated in response to a first signal and thus triggers a braking process in response to the first signal.

A second embodiment of a braking device of the invention for a vehicle, comprising
a) a brake pedal;
b) a brake actuator;
c) a control unit designed to activate the brake actuator as a function of the position of the brake pedal
d) a means of displaying a warning;
e) wherein the brake actuator and/or the means for displaying a warning can be activated in dependence on a third signal;
f) where the third signal has an increased priority in a radio network,
g) wherein the third signal contains information on a hazard level of a preceding vehicle.

An increased priority in the wireless network ensures low latency. Low latency reduces the time between a braking action of the preceding vehicle and a braking action of the receiving vehicle. Increased priority means that signals with an increased priority are transmitted more preferentially than all other signals without increased priority.

According to an embodiment the braking device is designed to receive the third signal from a fixed transmitter.

According to an embodiment the third signal is designed as at least a 2-bit signal, preferably a 2-bit, 3-bit or 4-bit signal. Bit signals can transmit a lot of information with small amounts of data.

According to an embodiment the hazard level will contain information on the preceding vehicle falling below a first velocity value, the preceding vehicle exceeding an absolute value of a first acceleration, the preceding vehicle exceeding an absolute value of a second acceleration and/or the preceding vehicle coming to a standstill.

According to an embodiment, each bit of a 3- or 4-bit signal is assigned to one of the following events: a falling below a first speed value by the preceding vehicle, an exceeding of an absolute value of a first acceleration by the preceding vehicle, an exceeding of an absolute value of a second acceleration by the preceding vehicle and/or a reaching of a standstill of the preceding vehicle, and preferably each of the events has a predetermined hazard level in the form of a natural number.

According to an embodiment, if several of the events occur simultaneously, an overall hazard level is formed as the sum of the individual hazard levels.

According to an embodiment, if a first overall hazard level value is exceeded, the means for displaying a warning is activated and if a second overall hazard level value is exceeded, the brake actuator is activated.

It may be preferable to include a distance between the vehicle and the preceding vehicle and a speed difference between the vehicles in order to calculate the overall risk level.

According to an embodiment, in the event of a communication failure between the vehicle and the radio network and/or fixed transmitter, a warning will be displayed on the means for displaying a warning. According to an embodiment, the warning is displayed on the means for displaying a warning after a predetermined time after the communication failure has occurred. Preferably, the communication failure warning is displayed after less than 10 seconds, more preferably after less than 5 seconds, and more preferably after less than 3 seconds.

According to an embodiment, the communication loss warning is deactivated after a successful radio link recovery. According to an embodiment, in the event of a communication failure, a timer is started which expires after the predetermined time. According to an embodiment, the timer is queried cyclically and, if the timer expires, the warning of a communication failure is displayed on the means for displaying a warning. According to an embodiment, if the radio connection is successfully re-established during the predetermined time, the timer is deactivated prematurely.

The second embodiment has the advantage that not the reception of a first or second signal activates a brake actuator or a means to display a warning, but that the content of a third signal is evaluated and the vehicle decides whether a warning is displayed or whether additional braking is applied. For example, if the speed of the vehicle is low or there is a long distance between road users, it could be that a warning is not necessary or is needed late.

BRIEF DESCRIPTION OF THE DRAWINGS

The invention is explained in more detail below by means of embodiments and associated drawings. The figures show.

DETAILED DESCRIPTION OF THE DRAWINGS

Figure 1:
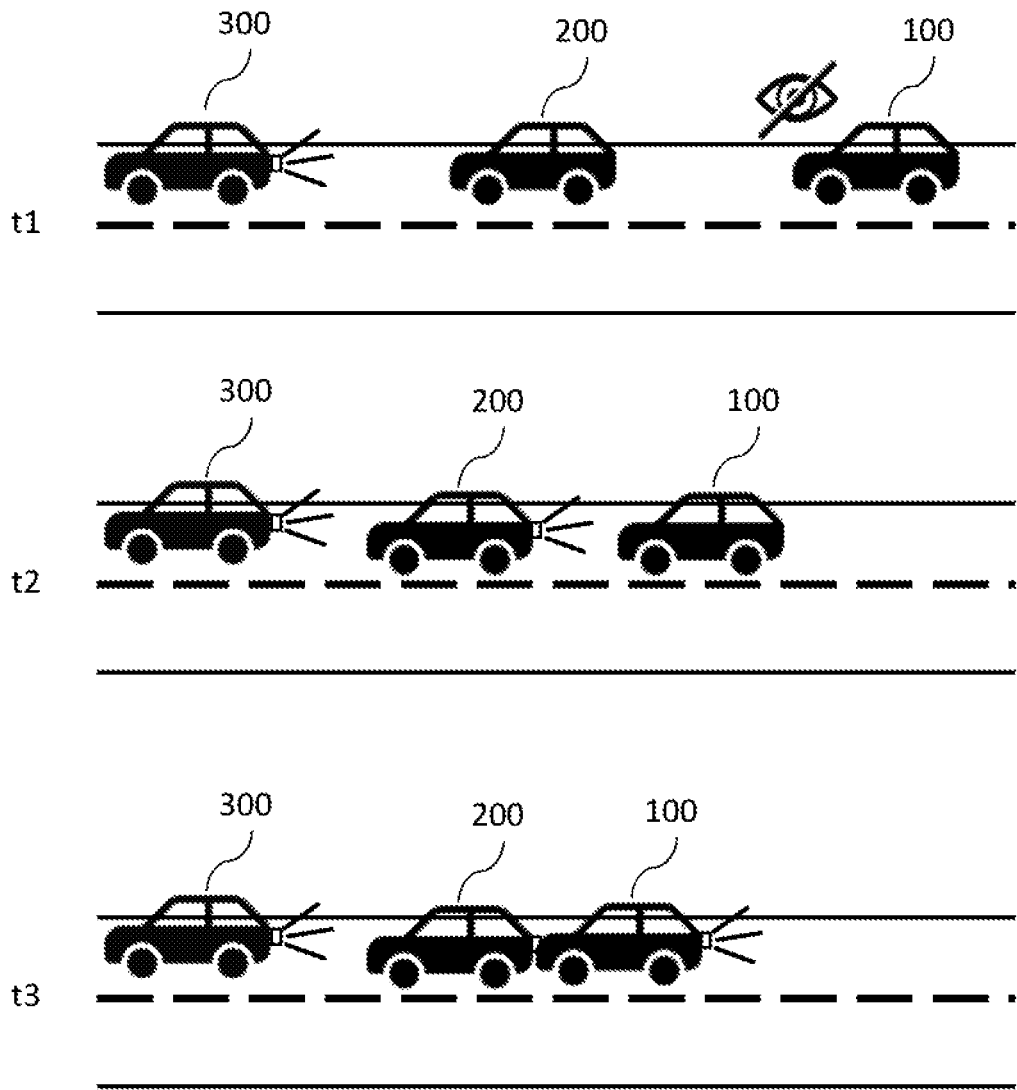
FIG. 1 a schematic view of a braking process in a conventional braking device for a vehicle.

FIG. 1 shows a schematic diagram of a braking process when using a conventional braking device for a vehicle 100. At an initial time t1, a preceding vehicle 300 starts to brake. An obstacle 200 (another vehicle) obscures the view from vehicle 100 and the driver of vehicle 100 therefore does not see that the preceding vehicle 300 is braking. At a second time t2, the other vehicle 200 starts to brake after a reaction time. Now vehicle 100 can see the braking of the other vehicle 200 and at a time t3 the vehicle 100 starts braking after another reaction time. Since vehicle 100 could not react to the braking of the directly preceding vehicle 300, the time between the start of the braking of the preceding vehicle 300 and the start of the braking of vehicle 100 is high and can therefore lead to a collision.

Figure 2:
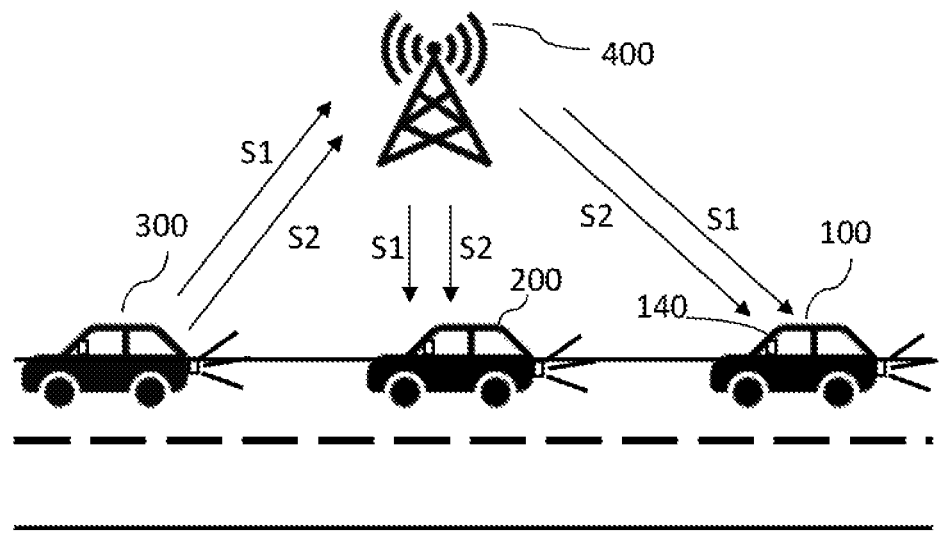
FIG. 2 a schematic view of a braking process of a first embodiment of the braking device of the invention for a vehicle.

FIG. 2 shows a schematic representation of a braking process of a first version of the braking device of the invention for a vehicle 100. When a preceding vehicle 300 starts a braking operation and the braking deceleration of the preceding vehicle 300 exceeds a first predetermined limit, the preceding vehicle 300 transmits a first signal S1 to a stationary transmitter mast 400, and when the braking deceleration of the preceding vehicle 300 exceeds a second predetermined limit, the preceding vehicle 300 transmits a second signal S2 to the transmitter mast 400, wherein the second predetermined limit is smaller in magnitude than the first predetermined limit. The transmission mast 400 now transmits the first signal and/or the second signal S2 to the subsequent vehicles 100, 200 if necessary. When vehicle 100 receives the first signal S1, a brake actuator 120 is activated and vehicle 100 starts a braking process. When the second signal S2 is received by vehicle 100, a means of displaying a warning 140 is preferably activated. This means of displaying a warning 140 is intended to give an early warning to a driver of vehicle 100 when the preceding vehicle 300 brakes slightly. In the braking device of the invention for a vehicle 100, it is irrelevant that the vehicle 100 has no visual contact with the preceding vehicle 300, since the first signal S1 and the second signal S2 are transmitted to the vehicle 100 by a fixed transmission mast 400 and thereby a braking operation can be started at the vehicle 100. The time to start the braking process of vehicle 100 is much less, since only a latency of transmission and reception determines the delay. The inventive braking device can thus effectively prevent rear-end collisions.

Figure 3:
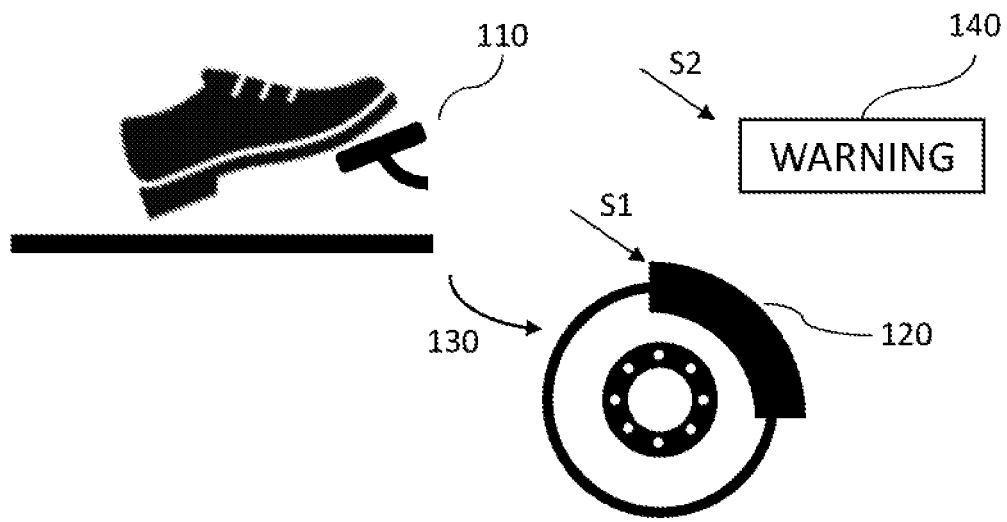
FIG. 3 a schematic view of a section of the first type of the braking device of the invention for a vehicle.

FIG. 3 shows a schematic diagram of a section of the first version of the braking device of the invention for a vehicle 100, showing a brake actuator 120. This brake actuator 120 initiates a braking operation on vehicle 100. The brake actuator 120 is activated by a control unit 130 as a function of the position of a brake pedal 110. In addition, the brake actuator 120 is designed to be activated depending on the first signal S1. The vehicle 100 can be braked automatically and manually, so it is a semi-automatic braking device. A means of displaying a warning 140 is also shown, this can be a screen display or a lamp, for example. The means for displaying a warning 140 is activated depending on the second signal S2.

It is also preferred that the first signal S1 has a higher priority than the second signal S2 in the radio network formed with the mast 400. An increased priority in the radio network ensures a low latency. A low latency reduces the time between a braking process of the vehicle in front and a braking process of the receiving vehicle. Increased priority means that signals with an increased priority are transmitted more preferentially than all other signals without increased priority. Furthermore, it prefers that both the first signal S1 and the second signal have an increased priority over other data signals in the radio network formed with the mast 400. Such other data signals can be, for example, those data signals through which the occupants of the vehicle 100, 200, 300 communicate with the Internet, e.g. to call up data services via separately carried mobile telephones of the vehicle occupants.

Figure 4:
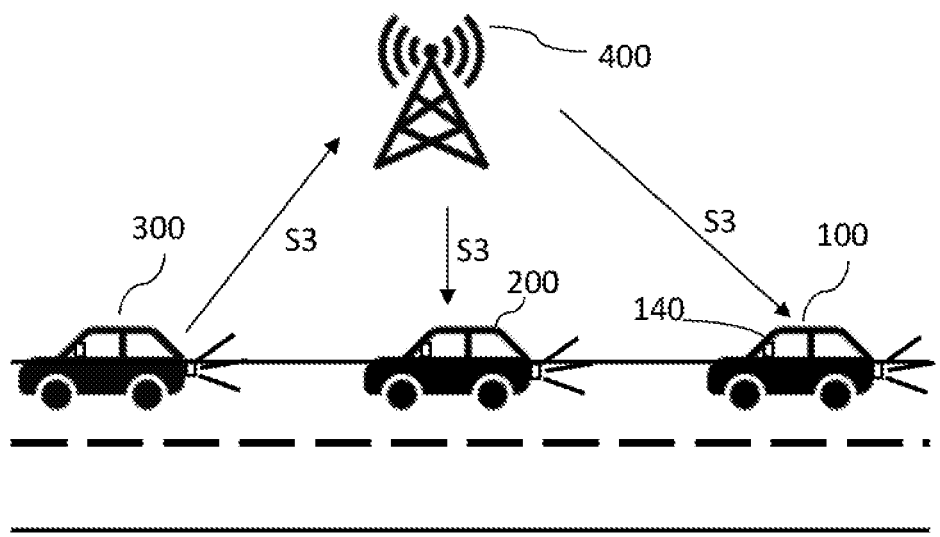
FIG. 4 a schematic view of a braking process of a second version of the braking device of the invention for a vehicle, and FIG. 5 a flow chart showing the operation of the second type of the braking device of the invention for a vehicle.

FIG. 4 shows a schematic representation of a braking process of a second version of the braking device of the invention for a vehicle. In this version, a third signal S3 is continuously (or when a limit value is exceeded, e.g. in relation to the deceleration of the vehicle 300) transmitted from a preceding vehicle 300 to a transmitter mast 400. This third signal S3 has a high priority in the radio network of the transmission mast 400 and it is preferably a 4-bit signal. In the case of the 4-bit signal, the first bit is activated when the speed of the preceding vehicle 300 falls below a first speed value, the second bit is activated when the acceleration of the preceding vehicle 300 falls below an absolute value of a first acceleration, the third bit is activated when the acceleration of the preceding vehicle 300 falls below an absolute value of a second acceleration and the fourth bit is activated when the preceding vehicle 300 has come to a standstill. The transmitter 400 now transmits the third signal S3 to the subsequent vehicles 100, 200. Vehicle 100 receives the 4-bit signal S3. A hazard level is assigned to each of the active bits and an overall hazard level is determined from the hazard levels. The braking device in the second version is designed to activate the brake actuator 120 and/or the means for displaying a warning 140 as a function of the magnitude of the individual hazard levels and/or as a function of the magnitude of the overall hazard level. In contrast to the first version, a braking process is not automatically started or a warning displayed when a signal is received, but the vehicle or the braking device receives a signal and decides on the basis of the content and, if necessary, further parameters whether a warning is displayed and/or whether braking is carried out automatically. Preferably, other factors can also be taken into account, e.g. the distance of the vehicle 100 to the preceding vehicle 300 or the speed differences could be taken into account in the decision.

Figure 5:
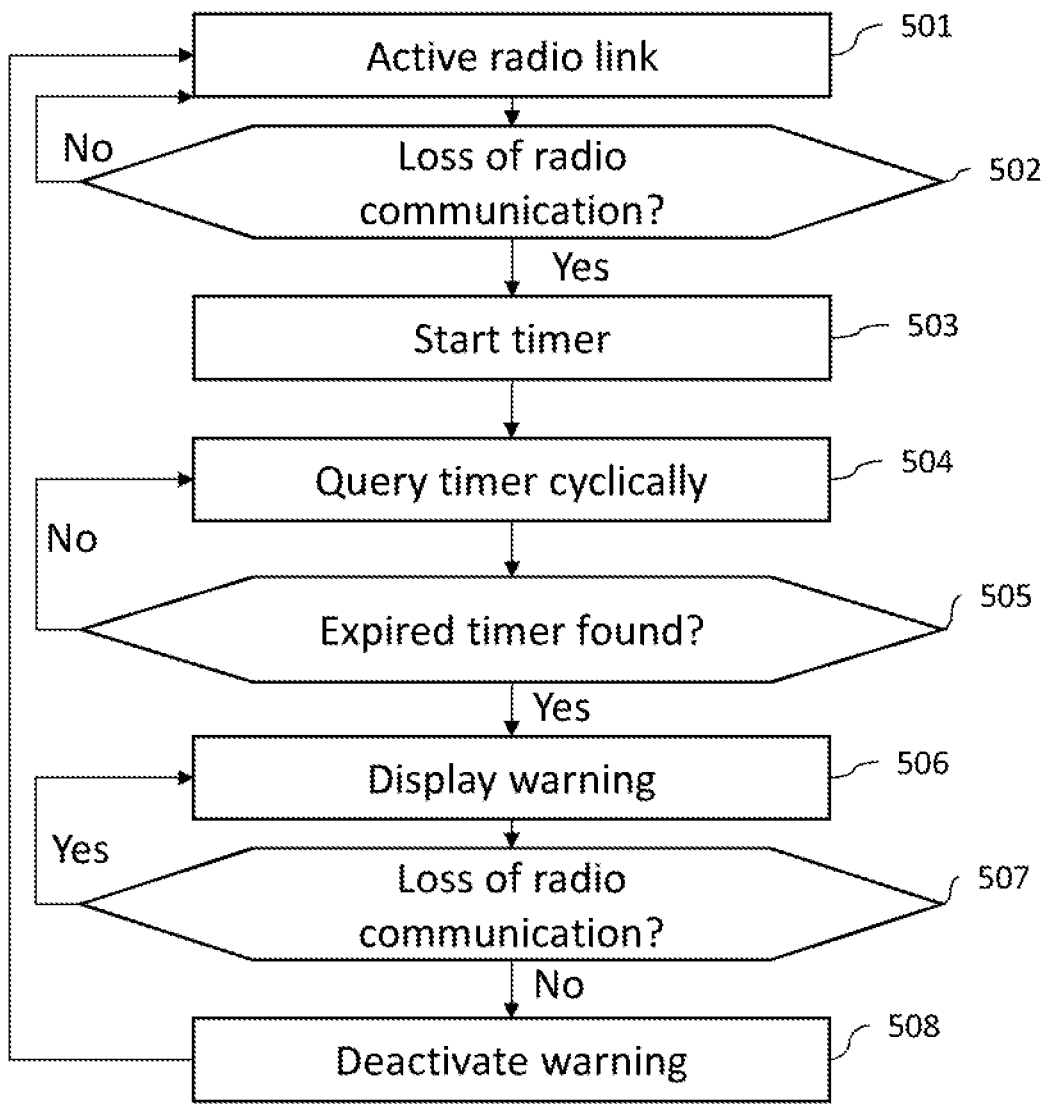

FIG. 5 is a flow chart showing the operation of the second type of the braking device of the invention for a vehicle in the event of loss of radio communication. If a state 501, in which an active radio link exists between the vehicle 100 and the transmitter 400, is interrupted by a detected communication failure in step 502, a timer is started in step 503. In step 504 the timer is queried cyclically to check whether it is still running. If an expired timer is found in step 505, a warning 140 is displayed on the means for displaying a warning 140 in step 506 to indicate the existence of the communication failure. If there is no communication failure in step 507, the warning on the means for displaying a warning is deactivated in step 508. This type of operation ensures that in a situation where automatic braking is not possible, e.g. radio failure in a tunnel, a driver will drive with increased concentration. This further increases the safety of the braking device according to the invention.

LIST OF REFERENCE SIGNS

100 Vehicle
200 Obstacle
300 Preceding vehicle
400 Transmitter
110 Brake pedal
120 Brake actuator
130 Control unit
140 Means for displaying a warning
S1 First signal
S2 Second signal
S3 Third signal

What is claimed is:

1. A braking device for a first vehicle, comprising:
 a) a brake pedal;
 b) a brake actuator;
 c) a control unit adapted to activate the brake actuator in dependence on the position of the brake pedal;
 d) wherein the brake actuator is adapted to be activated in dependence on a first signal,
 e) wherein the first signal contains information about a characteristic of a second vehicle which is at least partially obscured to the first vehicle,
 f) wherein the braking device is adapted to receive the first signal from the second vehicle via a stationary transmitter mast.

2. The braking device of claim 1, wherein the braking device is adapted to receive a second signal.

3. The braking device of claim 2, wherein the second signal contains information about a second characteristic of the second vehicle which is obscured by an obstacle.

4. The braking device of claim 3, wherein the braking device comprises a means for displaying a warning and the means for displaying a warning is activatable in dependence on the second signal.

5. The braking device of claim 4, wherein the second characteristic is a braking deceleration above a second predetermined limit value and the first characteristic is a braking deceleration above a first predetermined limit value.

6. A braking device for a first vehicle comprising:
 (a) a brake pedal;
 (b) a brake actuator;
 c) a control unit adapted to activate the brake actuator in dependence on the position of the brake pedal;
 d) a means for displaying a warning;
 e) wherein the braking device is adapted to receive the third signal from a second vehicle via a stationary transmitter mast, wherein the second vehicle is at least partially obscured to the first vehicle;
 f) wherein the brake actuator and/or the means for displaying a warning can are adapted to be activated in dependence on a third signal;
 g) wherein the third signal has an increased priority in a radio network, whereby signals with increased priority are transmitted in preference to other signals in the network,
 h) wherein the third signal contains information on a hazard level of a preceding vehicle.

7. The braking device of claim 6, wherein the third signal is configured as a 3-bit signal.

8. The braking device of claim 6, wherein the third signal is configured as a 4-bit signal.

9. The braking device of claim 6, wherein the hazard level contains information about falling below a first speed value, reaching a standstill, exceeding an absolute value of a first acceleration and/or exceeding an absolute value of a second acceleration.

10. The braking device of claim 6, wherein in the event of a communication failure a warning is displayed on the means for displaying a warning.

* * * * *